Figure 1:
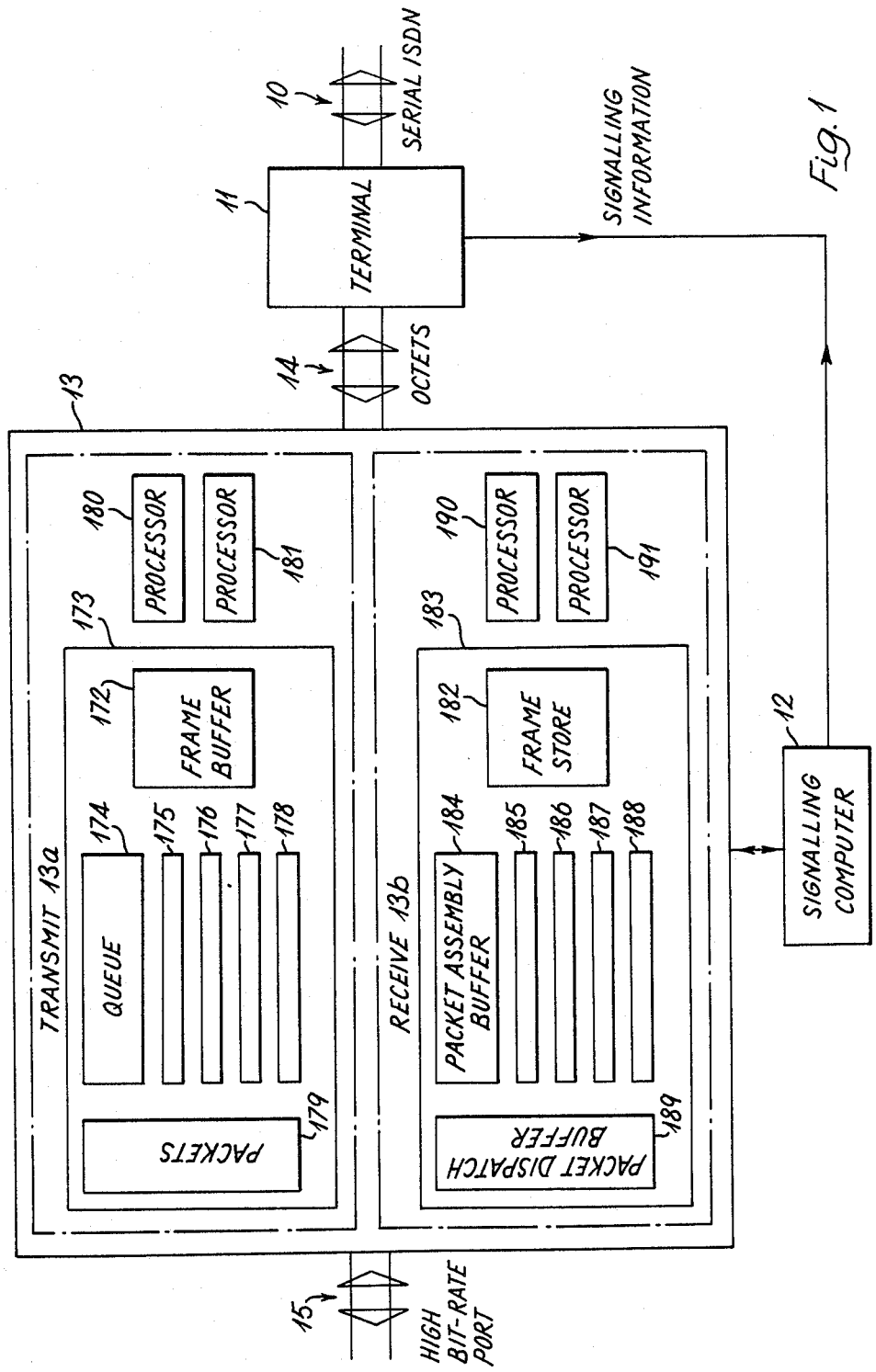

United States Patent [19]
Leslie et al.

[11] Patent Number: 4,805,167
[45] Date of Patent: Feb. 14, 1989

[54] VARIABLE DATA RATE CHANNEL FOR DIGITAL NETWORK

[76] Inventors: Ian M. Leslie, The Malthouse, Commerical End, Swaffham Bulbeck, Cambridge; John W. Burren, 18 Norman Avenue, Abingdon Oxon OX14 2HQ; Henry Pitura, 26 Columbia Drive, Leighton Buzzard, Bedfordshire LU7 8YM; David L. Tennenhouse, Darwin College, Silver Street, Cambridge; Christopher J. Adams, 58 Kdingston Road, Oxford, all of United Kingdom

[21] Appl. No.: 80,504

[22] Filed: Jul. 29, 1987

[30] Foreign Application Priority Data

Jul. 29, 1986 [GB] United Kingdom ............... 8618424

[51] Int. Cl.⁴ .............................................. H04J 3/16
[52] U.S. Cl. .................................... 370/84; 370/110.1
[58] Field of Search .................. 370/84, 85, 110, 68.1, 370/95, 122

[56] References Cited

U.S. PATENT DOCUMENTS 4,577,312  3/1986  Nash ....................................... 370/84
4,704,710  11/1987  Bowers et al. ......................... 370/84

FOREIGN PATENT DOCUMENTS 0016677  10/1980  European Pat. Off. .
85/04300  9/1985  PCT Int'l Appl. .
1402506  8/1975  United Kingdom .
1432168  4/1976  United Kingdom .
1527117  10/1978  United Kingdom .
2074420  10/1981  United Kingdom .

Primary Examiner—Robert L. Griffin
Assistant Examiner—Frank M. Scutch, III
Attorney, Agent, or Firm—Cushman, Darby & Cushman

[57] ABSTRACT

Digital data networks (such as the ISDN) which provide transmission between selected locations may use time multiplexed slots with predetermined maximum bit-rates. However local area networks (LANs) transmit packets, containing data bits, at a rate which varies frequently and often corresponds to a higher bit-rate than can be handled by individual slots. In the present invention packets arriving at an input port are allocated to a number of queues each for a respective destination, and each queue is allocated a group of slots on a digital data network. The slot contents are assembled into frames in a buffer store and transmitted to the digital network. On reception, the contents of several frames of incoming multiplexed slots are held in a frame store and then assembled into packets in a number of buffers making allowance for arrival in a different slot order and different frames. Marker signals are sent periodically in each slot and these are used to specify the order in which the slots were transmitted and to signal when the number of slots in each group is to change to allow for variations in packet traffic.

17 Claims, 6 Drawing Sheets

TRANSMISSION

RECEPTION

VARIABLE DATA RATE CHANNEL FOR DIGITAL NETWORK

The present invention relates to the provision of channels for digital networks, for example the Integrated Services Digital Network (ISDN), with bit-rates which are higher than the usual data-carrying channels of the networks.

The ISDN has been defined by the International Telegraph and Telephone Consultative Committee (CCITT) and the standards that have been recommended are based on the assumption that voice data, that is telephony, is one of the most important types of traffic that will be carried on the network. The standard means of converting an analogue voice signal to digital form is to sample the signal 8000 times per second, with each sample consisting of 8 bits of data. Thus the usual data-carrying channel in ISDN is a bidirectional channel carrying 64 Kbits/sec in each direction.

A "Primary Rate" bearer channel (the carrier) operating at 2048 Kbits/sec is also defined. This type of channel might be used for connecting a private 'branch' exchange to the network and is time division multiplexed into 32 sub-channels. Time division frames are made up of 32 octets of data, one octet (8 bits) from each sub-channel, and are sent in a continuous stream. In this specification the 32 positions in the time frame are called "slots". In each frame the first slot is used to identify the start of frame and another (known as the D channel) is reserved for providing the network with routing instructions. The remaining 30 slots may be used for data or digitised voice.

The primary rate channel carries 8000 frames per second and thus in order to send a 64 Kbits/sec signal through the system, it is split up into octets which are inserted into the same slot of successive frames.

A different ISDN is used in the USA where although 8000 frames per second are employed, a frame consists of 24 slots plus one start bit, giving a primary rate of 1544 Kbits/sec.

The data in a particular slot passes from its source to its destination through the network via one or more switching centres. At each of these centres data from any particular slot is extracted and placed in another slot in a frame travelling along the route to the destination. Octets placed in the same slot in successive frames leaving the source travel through the network in exactly the same fashion and arrive successively as the octets of a given slot in the frames arriving at the destination. However, the slot position within the carrier frame at the destination will not in general be the same as the slot position at the transmitter.

A disadvantage of the ISDN as described above, is that it is unsuitable for data traffic at higher rates than 64 Kbits/sec. This problem can be overcome to some extent by the system described in PCT Patent Specification WO 85/04300 where a group of 64 Kbits/sec data channels are assembled to form a channel having a higher bit-rate. The delay in each channel is monitored and then equalising delays are added in the channels so that data distributed in sequence over the channels on transmission is assembled in the same sequence on reception. However the system relies on setting up the group of channels as a whole and cannot be changed without being completely reset.

Where the high bit-rate channel is to be used for the transmission of data packets the bit-rate required between locations is likely to change frequently and therefore the number of channels grouped together must be changed often.

In this specification a bit-synchronised digital data network is a network which provides transmission channels between two, or any two of three or more, locations at predetermined bit-rates, each channel being established before transmission, and not by reference to information transmitted in the channel. The network maintains a frequency that is the same for all channels and is synchronised between all channels. Within one period of this frequency a channel which is carrying data accepts a predetermined number of bits at one location and delivers the same number of bits at another location.

The proposed ISDN standards define a network of this type in which the said frequency is 8-kilohertz and for this reason is said to have 8-kilohertz integrity. For two channels in a bit-synchronised digital data network having the same end-points the signal delay across the network may be different for the two channels, but, in any given number of periods of the basic frequency, exactly the same number of bits are delivered on the two channels.

According to a first aspect of the present invention there is provided a method of transmitting high bit-rate signals having a variable bit-rate including the steps of
  dividing a digital input signal having a bit-rate higher than a predetermined bit-rate into a sequence of subordinate digital signals having data rates equal to or less than the said predetermined bit-rate.
  transmitting the subordinate digital signals using a group of transmission channels with each subordinate signal transmitted by a respective channel, the channels in the group each being capable of handling the said predetermined bit-rate.
  receiving the transmitted signals,
  assembling the received subordinate signals to provide an output signal in which the sequence of data bits is the same as that of the input signal, and
  changing, from time to time, the number of the said transmission channels making up the said group while continuing to transmit subordinate signals along those channels of the said group which are not changed.

According to an important feature of the present invention each subordinate digital signal has a marker signal added periodically which on reception is used to assemble the subordinate signals in the correct order.

The marker signals may for example comprise digital signals specifying the order of the subordinate signals in the said sequence, and, preferably, digital flag signals indicating whether a channel containing the subordinate signal is in use, being prepared for use, or about to be closed down.

The high bit-rate digital signals may be transmitted over a bit-synchronised digital data network as hereinbefore defined, when the said transmission channels are the transmission channels of the said network.

If the bit-synchronised digital data network is an ISDN then the transmission channels are slots.

The ISDN standards are expected to include the possibility of transmitting signals having data rates higher than 64 Kbits/sec using groups of slots but as envisaged the slots are to be sent through the system along identical routes and are subject to similar reordering in the network. For groups of slots to be used in this way, constraints will have to be imposed either on the sender by limiting the choice of slots that may be grouped together or on the construction of the switching centres, since otherwise the data will, in general, be jumbled and octets will not arrive in the same sequence that they were sent. There are two reasons for this jumbling of the data: firstly the slots at the destination will in general be ordered differently from those at the sending end; and secondly octets sent in the same frame but in different slots will not necessarily arrive at the destination in the same frame.

The chance of obtaining a group of slots which can be used in the way envisaged in the emerging ISDN standards is much lower than that of obtaining the same number of individual unrelated slots, which can emerge from the network after unknown slot re-ordering and relative slipping of data between frames. An advantage of the first aspect of the invention is therefore that groups of slots, in which the slots have no specially imposed relationship, may be used provided data in the slots used is assembled in the correct order on reception.

However, a more important advantage is the ability to change the maximum bit-rate of a group of slots by changing the number of slots in the group when required by a change in traffic density; for example by an increase or decrease in the number of data packets to be sent between two locations per second.

The process of dividing the input signal into subordinate signals may be carried out by allocating a first occurring portion of the input signal to a first subordinate signal, a second occurring portion to a second subordinate signal and so on until all the subordinate signals have been allocated, and then repeating the process cyclically. The division into portions is based on the properties of the channels being grouped, and not on any property of the data.

The invention may be employed to transmit a number of high rate digital input signals, each by way of a respective group of the said transmission channels. If an ISDN is used, each input signal is transmitted by a respective group of time slots and in such a system the marker signals for each input signal may be transmitted in the time slots for that group.

The method of the first aspect of the present invention has an apparatus counterpart and therefore according to a second aspect of the present invention there is provided apparatus for use in transmitting and receiving high bit-rate digital signals comprising a transmitter having means for dividing a digital input signal having a bit-rate higher than a predetermined bit-rate into a sequence of subordinate digital signals having data rates equal to or less than the said predetermined bit-rate, and means for transmitting the subordinate digital signals by way of a group of transmission channels, each channel being capable of handling the said predetermined bit-rate, with each subordinate signal transmitted by a respective channel, and a receiver having means for receiving the transmitted signals, and means for assembling the received subordinate signals to provide an output signal in which the sequence of data bits is the same as that of the input signal, the apparatus including means for changing, from time to time, the number of the said transmission channels making up the said group while continuing to transmit subordinate signals along those channels of the said group which are not changed.

According to a third aspect of the invention there is provided a method of using a digital data network including the steps of dividing a digital input signal having a given bit-rate into a sequence of subordinate digital signals each having a lower bit-rate, transmitting the subordinate digital signals by the said network using a group of the said transmission channels with each subordinate signal transmitted by a respective channel, receiving the transmitted signals, and assembling the received subordinate signals to provide an output signal.

The present invention also includes, as separate items, transmission methods, transmissions apparatus, reception methods and reception apparatus for operating the method and apparatus of the first, second and third aspects of the invention.

Figure 2:
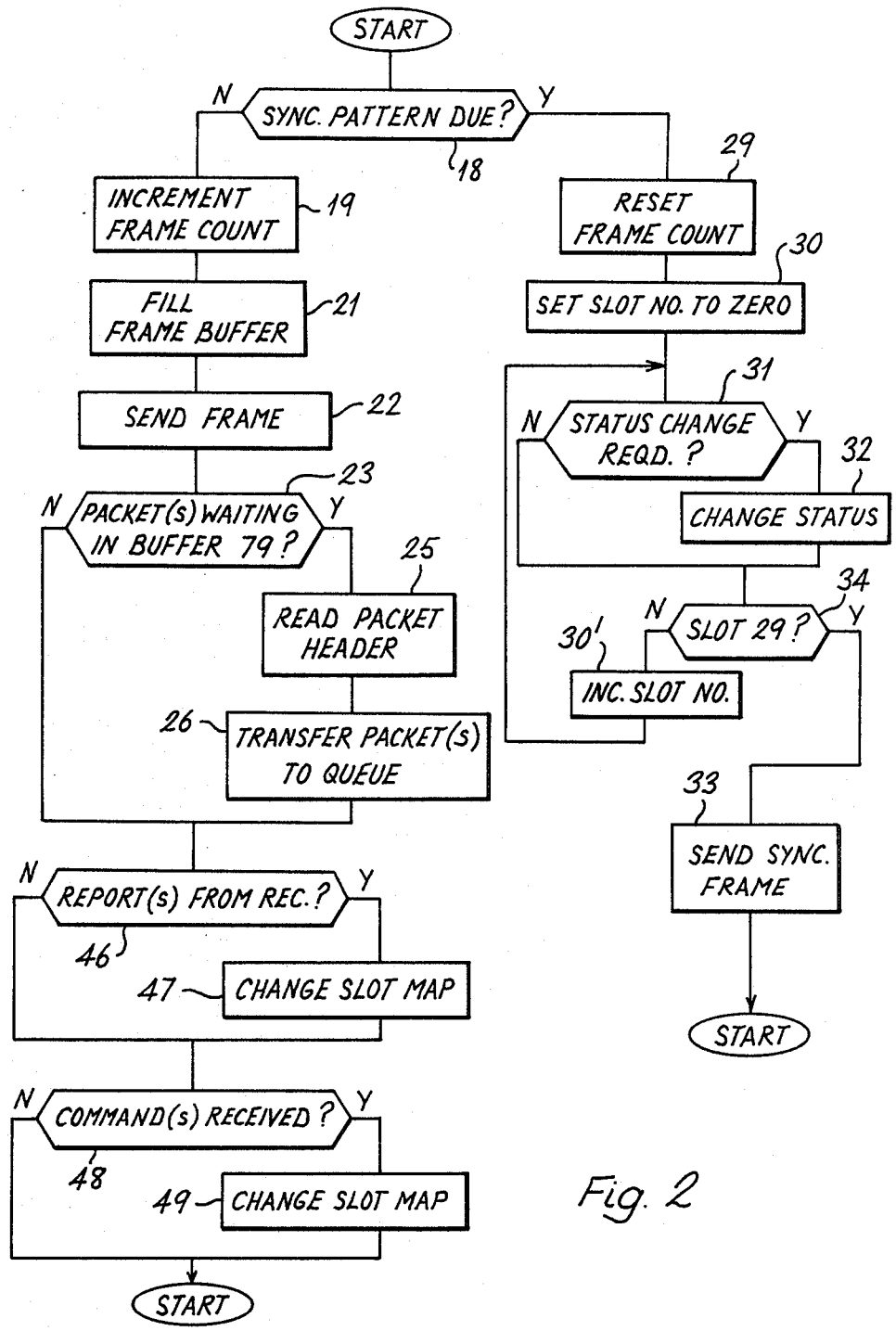
Figure 3:
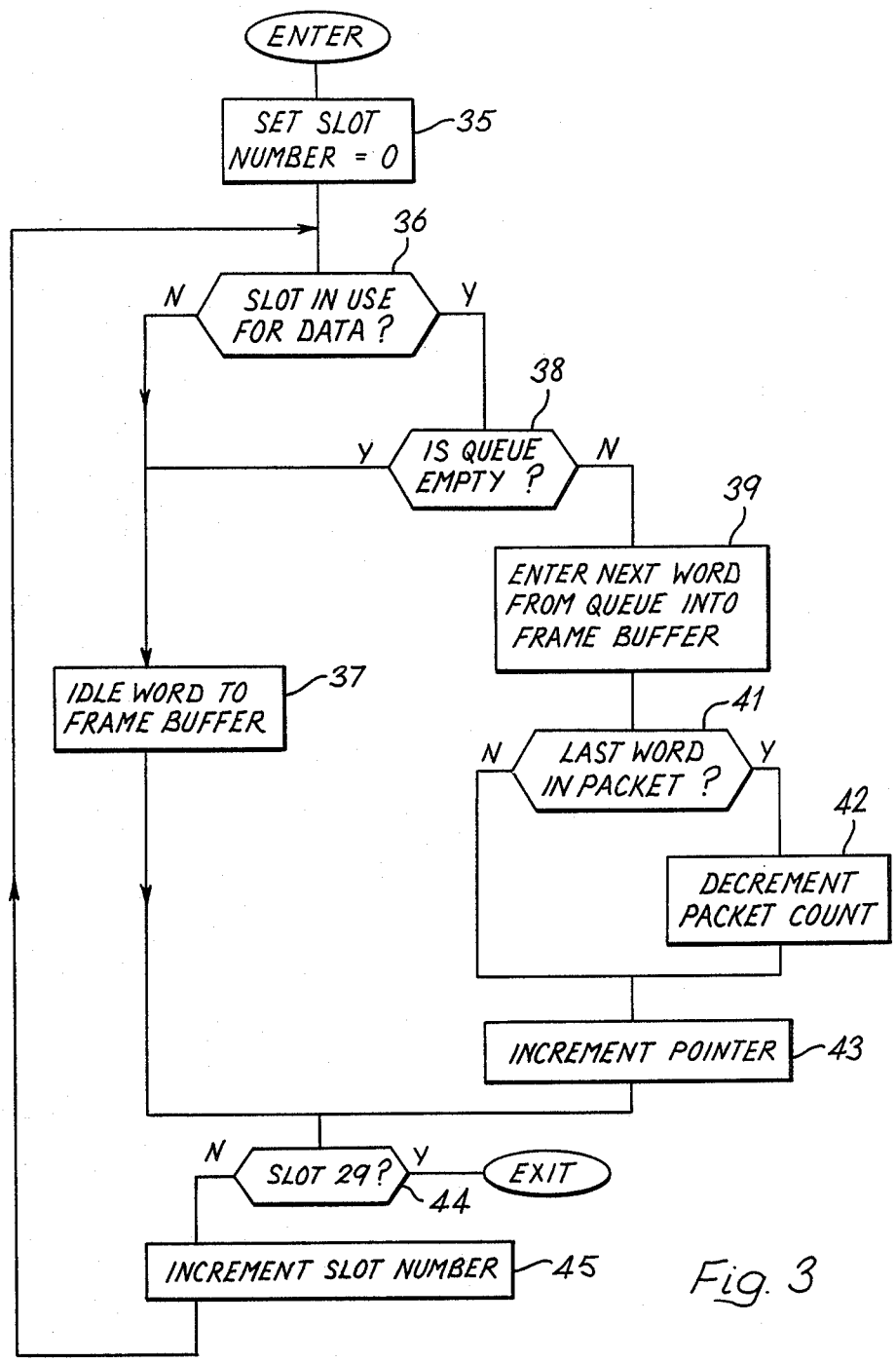
Figure 4A:
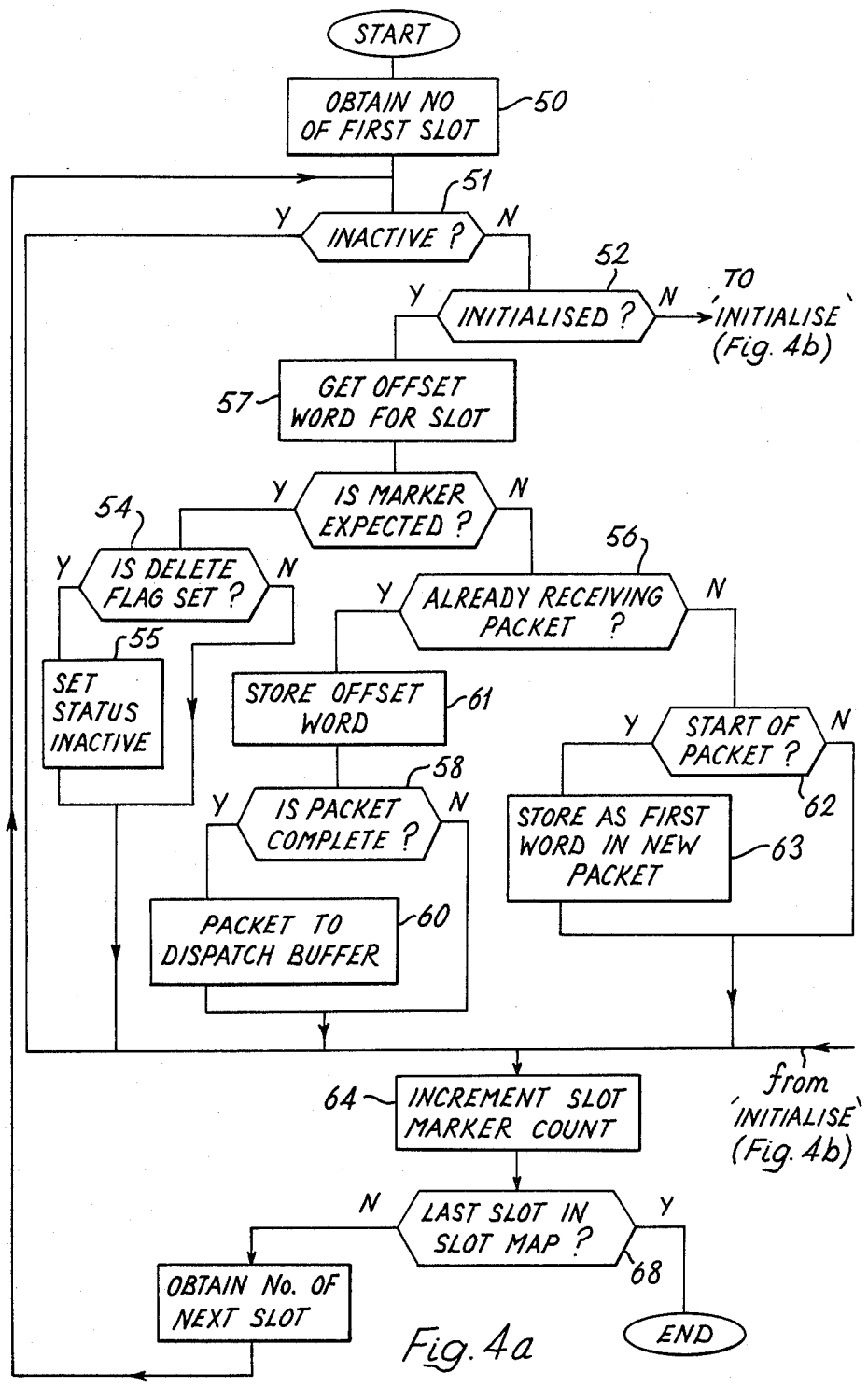
Figure 4B:
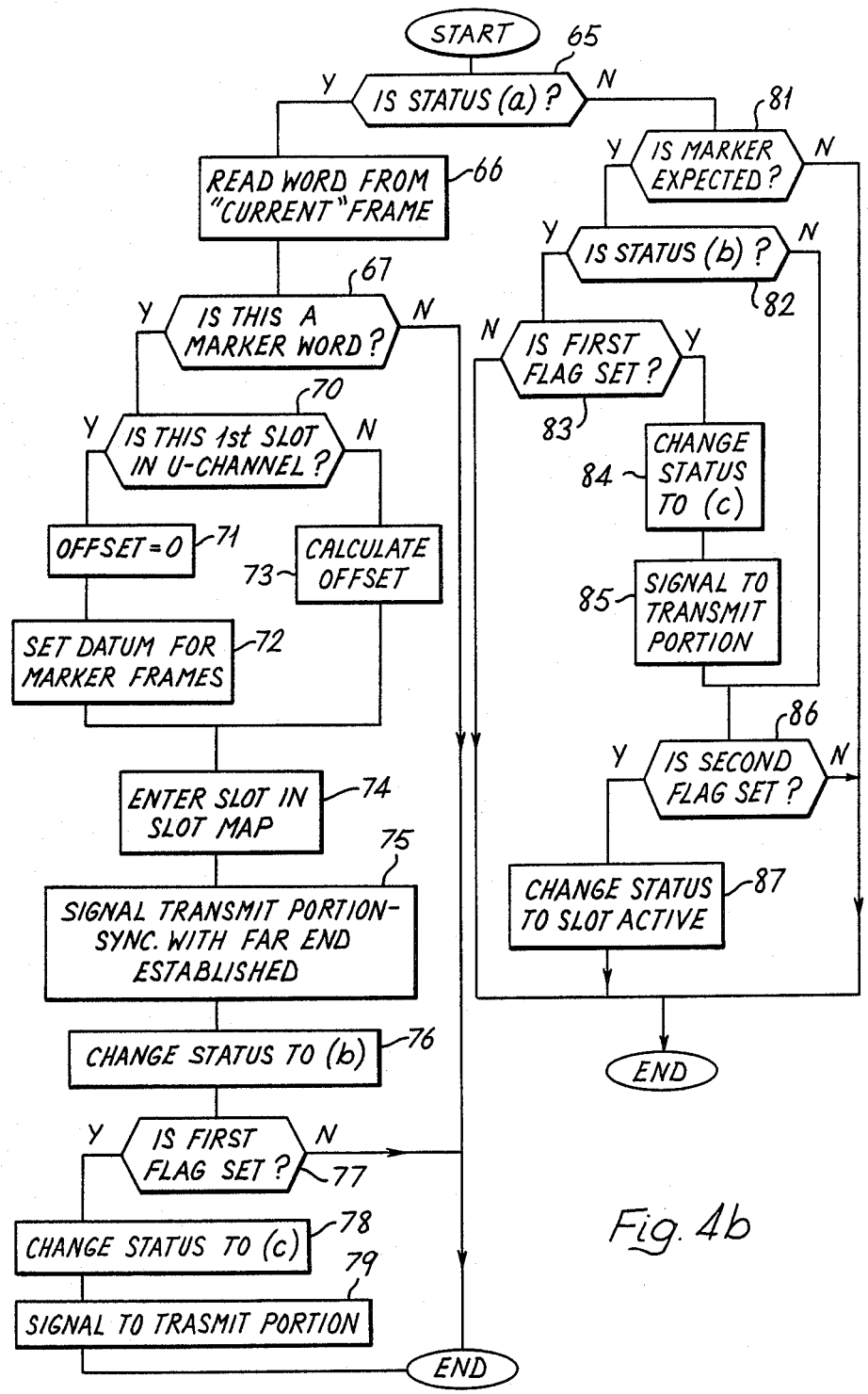
Figure 5A:
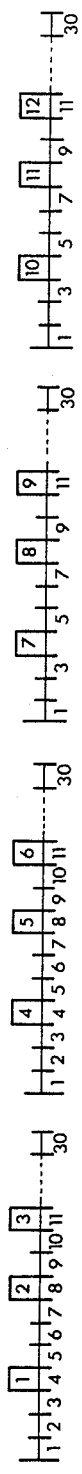
Figure 5B:
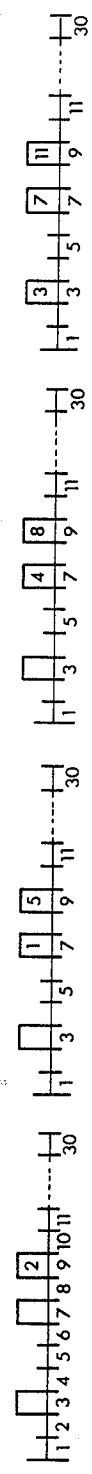

The invention will now be described by way of example with reference to the accompanying drawings, in which:

FIG. 1 is a block diagram including apparatus according to the second aspect of the present invention, FIG. 2 shows a flow diagram showing the operation of the computer 13 of FIG. 1 on transmission, FIG. 3 is a flow diagram showing operation 21 of FIG. 2 in more detail, FIGS. 4a and 4b form a flow diagram showing the operation of the computer 13 of FIG. 1 on reception, and FIGS. 5a and 5b show how time slots used in operating the invention may change order during transmission.

In FIG. 1 a bidirectional serial digital link 10 forming part of an ISDN is connected to a terminal 11 of known construction conforming to the ISDN standards. In operation the terminal 11 requests through paths for 64 Kbits/sec channels (that is slots) through the ISDN network (which includes switching centres) to similar terminals at remote locations. Information for requesting through connections is supplied to the terminal 11 by a signalling computer 12, which may conveniently be a microprocessor, and routing and destination information is entered into the D channel of the ISDN frame described above. The ISDN link, via the D channel extracted by the terminal 11, also supplies the computer 12 with information identifying incoming channels, that is channels whose initiation has been carried out at the remote end. The terminal 11 has complete control over the allocation of channels to slots in every ISDN frame which it transmits over the link 10 but, as mentioned above, when the slot frames reach switching centres, the frames are usually divided so that slots in a single incoming frame may be transmitted from the switching centre in different frames to different destinations. Even where several slots in a single frame from a single terminal are to be transmitted to the same destination the signals in the slots may travel by various routes and may experience relative delays which cause the slots to arrive at the destination in a different order from that in which they were transmitted from the originating terminal. However, on reception, information is sent in the D channel giving the allocation of slots to channels and thus although slot position is, in general, different from that used on transmission, a particular slot position is known to belong to a certain channel.

In the present invention a further computer 13 is connected by way of a bidirectional interface 14 to those connections of the terminal 11 which are assigned to receive signals for insertion in the slots and which are assigned to transmit signals received in the slots. In the present example the computer 13 transmits and receives data signals to and from a local area network, primarily for passing data between computers (for example a Cambridge Ring or Ethernet) by way of a variable rate bidirectional digital input/output port 15 connected to a further computer (not shown) which is itself connected to the network. In general the bit-rate in the port 15 is higher than that in a slot of the ISDN system.

The local area networks transmit packets comprising groups of octets of data bits. Each packet begins with an octet indicating the start of a packet and the packet length is usually delineated in some way, for example as specified by the content of octets following the start octet. The packet also contains information on its destination. Octets which contain no information (idle octets) may be sent between packets but they must be different from start octets. Idle octets have a characteristic bit pattern which may be the same as an information octet, the difference between data and idle signals being determined by whether the octet is inside a package or not.

The computer 13 receives packets over the port 15 and for transmission sorts the packets out according to destination and applies them to the terminal 11 in such a way that the information contained is passed along a number of unrelated slots thus allowing each packet to have a higher bit rate than a single slot. Each slot also carries marker/synchronising signals at fixed intervals which allow the slots to be assembled in the correct order by a similar arrangement to that of FIG. 1 but at a remote location. Thus the computer 13 at the remote location assembles packets received and passes them by way of its port 15 and the local area network to their destination.

The computer 13 must function at high speed in view of the high bit-rate of the ISDN system. For this reason it may comprise a number of INMOS Transputers type IMS T414 or T800; for example two transputers may form a computer portion 13a which is for transmission and two further transputers may form another computer portion 13b for reception. Each transputer has four 10 Mbits/sec duplex serial links providing concurrent message passing capability. These links may be used to interconnect the transputers and to connect to the interface 14, the port 15, and the signalling computer 12. For example as shown in FIG. 1, processors 180 and 190 use store areas 173 and 183 and processors 181 and 191 pass data octets to and from the interface 14, each of these processors being one transputer.

Since transputers are not fast enough to handle data as octets, the computer 13 handles the data in words of four octets but the transputer 181 on the transmit side and the transputer 191 on the receive side form the words into octets and the octets into words, respectively.

On the transmit side a frame of thirty words is generated and the transputer 181 generates four frames of octets by first taking the first byte from each word, then the second byte from each word and so on.

In this case (where the data is handled in words), idle words, rather than idle octets, are used. The words have a form which makes it possible for the receiver to establish which byte in the octets received is the first byte in a word; thus the idle word may have the form: byte 1—all zeros, bytes 2, 3 and 4—all ones.

On the receive side the corresponding transputer 191 receives frames of octets and converts these to frames of words. For each slot, when use of the slot is initiated, the transputer 191 establishes which byte is the first byte of the words. This it does by ensuring that the idle word is received correctly.

In describing the operation of FIG. 1 further, data is considered as being in "words" but it must be understood that such a process as has just been described converts to and from frames of octets.

In FIG. 1, packets are divided into groups according to destination and each group is formed into a high bit-rate signal which is transmitted simultaneously with the other high bit-rate signals.

Each high bit-rate signal is considered as being transmitted by what is known in this specification as a U-channel which uses a number of ISDN slots which together give the required bit-rate. The U-channels are assembled in the ISDN frames by the computer 13 so that each ISDN frame contains intervals of all the high bit rate signals. The 30 available slots of an ISDN primary rate channel may be divided into U-channels in any way consistent with the total number of slots used being less than or equal to 30, i.e. there may be a single U-channel with 30 slots or at the other extreme there may be 30 U-channels each with one slot. In the example presented here the case with five active U-channels will be considered.

The ISDN slots are used in a duplex fashion with transmission and reception for any one slot being between the same two locations. In general each such slot is not in the same position in the ISDN frame at each of these locations.

The process of setting up U-channels and changing the number of U-channels in use is a continuous one in the sense that changes can be made during an interval which includes a number of synchronisation signals sent from both locations. Initially a command is sent to set up a U-channel to a given location and this command is implemented in the way which is now briefly described and whose operation can be seen in more detail in the flow charts of FIGS. 2, 3, 4a and 4b. Commands are generated externally according to traffic requirements and are usually generated by a computer (or possibly an operator) carrying out management functions.

When a new U-channel is to be initiated between two locations or another slot is to be added to an existing U-channel, both the near and far ends receive instructions from the respective signalling computer 12 that a certain ISDN slot is to be used. Both ends then send synchronisation signals at intervals. Slots carry distinctive "idle" signals when not in use so when the synchronisation signals are first sent they are sent at intervals with relatively long intervals of idle signals between them. Since the near and far ends are not, in general. synchronised this process usually starts at one end before the other. When, for example, the far end receives marker signals in the slot, it transmits a first synchronisation flag and when this first flag is received at the near end it is a signal that the channel is synchronised and data can be sent. Thus on receiving the first flag the near end sends a second data flag followed immediately by data in the appropriate slot. When the slot is to be removed from a U-channel or a U-channel is closed down then the two ends simply transmit a third, end-of-data, flag and cease to send data immediately that flag has been sent.

The store area 173 contains a frame buffer 172 and holds words for ISDN slots making up a single ISDN frame. The processor 180 executes the flow chart of FIG. 2 repeatedly, once for every frame to fill the frames. A test 1B is first carried out to determine whether marker signals are due to be inserted. Such signals are inserted at regular intervals, say every 100 or 200 new frames, and the test 18 is carried out by determining whether an ISDN count has reached the interval limit (for example 100). If a marker signal is not due a frame count is incremented by one in an operation 19. Then data from five queue areas 174 to 178 in the memory of the computer 13 which, as will be explained, hold sorted data from incoming packets, and correspond to the five U-channels, are used in an operation 21 to fill a buffer 172 in locations corresponding to ISDN slots. When the slots for all the U-channels have been filled and the slots not in use for U-channels have been filled with the idle word, the contents of the buffer 172 are sent in an operation 22 to the terminal 11 by means of one of the transputer links allocated for transmission as mentioned above.

In general the number of U-channels in use can, as mentioned above, vary from 0 to 30 so the number of queues is also variable.

The operation 21 of filling the slots in the ISDN buffer for each U-channel is now described and in order to carry out this operation the flow chart of FIG. 3 is completed from enter to exit once for each frame. The U-channel to which each ISDN slot is allocated is stored in an array known as "slot map", an example of which is given in Table 1. Only part of a slot map is shown and the numbering of the ISDN slots refers to the slots available for transmission, not the actual ISDN numbering.

TABLE 1

| ISDN slots | 0 | 1 | 2 | 3 | 27 | 28 | 29 |
|---|---|---|---|---|---|---|---|
| U channels | X | X | 5 | 4 | 5 | 3 | 2 |
| Status | 1 | 1 | 4 | 5 | 4 | 3 | 4 |

[Note: X indicates not in use]

The status of each channel is coded as follows:
(1) Not in use.
(2) Allocated to U-channel, but far end has not indicated that it has locked on to marker.
(3) Allocated to U-channel, far end has indicated that it has locked on to marker, but not yet in use for data.
(4) Allocated to U-channel and in use for data.
(5) Allocated to U-channel and in use for data, but should be removed from U-channel when next marker is sent.

In the first operation 35 of FIG. 3 a slot number count is set to zero and then a test 36 is carried out to determine from the slot map whether a slot is in use for data. If it is not, an "idle" word is entered into the frame buffer 172 (operation 37). If the test 36 indicates that the slot is in use for data then a further test 38 is carried out to determine whether the queue for the U-channel associated with that slot is empty and if so then the operation 37 is carried out. If not then the next word from the queue for that U-channel is entered into the frame buffer (operation 39). Next a test 41 determines whether the word just entered is the last word in a packet and if so a count specifying the number of packets in the queue is decremented (operation 42). It is now necessary to increment a pointer indicating the position of the next word in the queue and this is carried out in an operation 43. In this operation it may be necessary to move the pointer to the start of the next packet.

Following either of the operations 37 or 43, a test 44 determines whether FIG. 3 has been traversed for all slots in the frame. If not the slot number is incremented (operation 45) and a loop back to the test 36 occurs. Otherwise there is a return to a test 23 in FIG. 2.

The next part of the flow chart of FIG. 2 is concerned with storing packet signals from the port 15 and preparing them for filling U-channels. A portion 179 of the store of the computer 13 is allocated to hold packets received by way of the port 15. A test 23 determines whether any packets waiting for sorting are held in the store portion 179 and if so an operation 25 is carried out in which the packet header is read, and then the packet is transferred using the header to the appropriate queue and a pointer for the portion 179 is adjusted (operation 26).

Next a test 46 checks whether the processor of the computer 13b has received a flag indicating that a change in the status of slots in the slot map is required. If so the status of the appropriate slots in the slot map is changed in an operation 47. Next a check 48 is carried out to determine whether a command has been received to add or delete a slot from one of the U-channels. If so the status of the slot map is changed in an operation 49 but the actual resulting action is not carried out until synchronisation signals are due and sent.

Operation will now be considered following the determination by the test 18 that synchronisation signals are due. After resetting the frame count in an operation 29 and setting a slot count to zero (operation 30), a test 31 refers to the results of the tests 46 and 48 and the operations 47 and 49 to determine whether the allocation of ISDN slots to U-channels has changed since the previous transmission of the synchronisation pattern. This information is supplied by the computer 12 as a result of changes in the ISDN slots which are to be used as indicated by the ISDN network in response to requests made by the signalling computer. For example, if a new U-channel is to be set up to transmit packets to a new destination then a new slot arrangement (that is a new slot map) is required. A new slot map is also needed if changes in bit rate for U-channels require a change in the number of ISDN slots needed for that channel. If the test 31 indicates that a new slot map is required then an operation 32 is carried out in which part of the tables of the form shown in Tables 1 and 2 are changed and stored by the computer 13.

Table 2 shows an example, for slots 15 to 18, of the synchronisation/marker signals which are sent at regular intervals. The synchronisation signals for all slots are transmitted in the same frame.

TABLE 2

| ISDN slot position | Data carried in a synchronisation frame | | | |
|---|---|---|---|---|
| | 1st octet | 2nd octet | 3rd octet | 4th octet |
| 15 | X | 15 | Y | 110 |
| 16 | X | 16 | Y | 100 |
| 17 | X | 17 | Y | 110 |
| 18 | X | 18 | Y | 111 |

The numbers in column 3 indicate the transmitting slot position which allows the receiver to establish how data in the receive slots should be rearranged in order to preserve the sequence of data. The last column contains the above mentioned flags indicating whether a slot is in use, synchronised or about to be closed down. The flags are in binary with one bit for each flag. In this example the flags show that the slots 15 and 17 are in use, in synchronism,. and not about to be closed down; the slot 16 is in synchronism but not yet in use; and the slot 18 is about to be closed down. X and Y are two fixed octet values, which are chosen to minimise the Chance of the receiver mistaking a sequence of data frames for a sequence of synchronisation frames. The operation 32 updates the slot map for the current slot. Next test 34 determines whether all slots have been processed and if not the slot number is incremented (operation 30') and a jump back to the test 31 occurs. The synchronisation frames are constructed by the processor 180 from the slot map, signals received from the receive computer portion 13b and commands. The frames are sent in operation 33 to the buffer 172 in the store 173 and thus to the ISDN terminal 11. The portion of the synchronisation pattern pertaining to a particular U-channel will be received at the destination of this U-channel, where the information is used to re-assemble the data received on that U-channel into the correct sequence of words.

For reception, the transputer 190 uses a storage area 183 allocated to contain a buffer area IB2 which holds a number of received frames, a set of packet assembly buffers 184 to 188, one for each U-channel and a packet dispatch buffer 189 where complete received packets await dispatch to their ultimate destination via the port 15.

The data carried in the ISDN slots which arrive at the terminal 11 are passed to the computer 13 and placed as complete frames of thirty words in the buffer 182. A number of such frames, for example five, are held at a time. Indications of the associations between receive slots and originating locations are received by the computer 12 from the ISDN network on channel 16 (the D channel) and thus the computer 12 is able to inform the computer 13 which slots belong to particular U-channels. As mentioned above, the slots are used in duplex fashion, but the numbering of the slots at one end is usually different from that at the other end. Thus each slot usually has a different number at one end than at the other.

FIG. 5 illustrates how the slots in a U-channel may be delayed and their order changed between transmission and reception. The U-channel shown employs slots 4, 8 and 11 in the ISDN frame on transmission and octets are entered into these slots in the order given by the number 1 to 12 in FIG. 5a which relates to transmission. On reception this U-channel uses slots 3, 7 and 9 of the ISDN frame and the order in which the octets 1 to 11 are received is shown. Both FIGS. 5a and 5b are divided into four ISDN frames shown in the sequence of arrival so that in FIG. 5b it can be seen that the octets arrive in the order 2, 1, 5, 4, 8, 3, 7, 11.

The following information codes are stored by the receive portion 13b for each slot:

(1) Status—whether the slot is active, initialising or inactive.

During initialisation codes indicating one of three states are also stored: (a) looking for the first marker signal to appear in that U-channel, (b) waiting for the "far end synchronised" flag to be set in the received marker, and (c) waiting for the "far-end sending data" flag to be set in the received marker.

(2) The U-channel to which the slot is associated, (3) The skew offset for the slot; that is the frame in which the slot appears relative to a frame which is designated as "current", and (4) A marker count for the slot. On the receive side slots do not all receive the marker in the same frame so there has to be a frame count associated with each slot to determine when a marker is expected.

On reception, slots making up a complete frame are read one at a time and if they contain data the data is passed to the appropriate one of packet assembly buffers 184 to 185. The order in which the slots are read is not the order in which they appear in the receive frame but instead, the order in which the slots were transmitted, is used. Thus if data is transmitted in slots 3 and 5 and received in slots 20 and 2 respectively then slot 20 would be read before slot 2. The order in which the slots is read is stored by the receive portion 13b as a receive slot map which is entered in the order in which the slots were transmitted and provides, on exit, the ISDN slot in the receive frame which is to be read. This slot map is constructed in a way which is explained later in connection with FIG. 4b, as is the way in which some of the information codes for each slot are obtained and stored. The frame store 32 holds five frames in order of reception. The third of these frames in order of reception is designated as the "current" frame so that the skew offset for a slot is determined relative to the current frame and stored as information code (3) for that slot. The offset is determined, as is explained later, when synchronisation signals are received. When data is being received the appropriate one of the five buffers in the frame store 182 is then read according to the offset to find the data for the slot being read.

The transputer 190 executes the operations given in the flow charts of FIGS. 4a and 4b once each time a frame is received. At the beginning an operation 50 is carried out to obtain the number of the first slot from the receive slot map. A test 51 then checks whether the slot is inactive and if not a test 52 checks whether the slot is initialised, both these tests being carried out on the stored information codes. If the slot is initialised then in an operation 57, the offset word for the slot is obtained from the appropriate frame in the store 182 using the information code (3). Next, a test 53 checks whether a marker is expected by examining the information code (4). If the marker is expected then a test 54 and an operation 55 check whether the delete flag in the offset word is set and if so, set the slot status (information code (1)) as inactive.

If the test 53 shows that no marker is expected then test 56 determines from a count kept for each packet assembly buffer 84 to 88 whether the data received is in the middle of a packet which is being received. In an operation 61 the offset word is transferred to the appropriate packet assembly buffer 184 to 188. A test 58 determines whether the packet is complete by examining the packet count and if so it is sent from the appropriate one of the packet assembly buffers to the packet despatch buffer 189 in an operation 60.

If the test 56 shows that the data in the slot being examined is not in the middle of a packet then a test 62 determines if a start of a packet word has been received. If so the word received is stored as the first word in a new packet in one of the packet assembly buffers 184 to 188 (operation 63). If the word received is an idle word and therefore not the start of a packet then it is not transferred to any of the packet assembly buffers.

If the test 52 shows that a slot is not initialised then operation is transferred to the flow chart of FIG. 4b. First the stored information codes are read to determine whether the slot has status (a). If so then the receive slot map is used to read the word in that slot from the "current" frame (operation 66). If this word is not a marker signal as indicated by a test 67 then a return is made to FIG. 4a where an operation 64 which will be described later is carried out. Such a return to the operation 64 is made at all points in FIG. 4b where an "End" is shown. If the word received is a marker then a test 70 determines whether this marker word is in the first slot to be received in a U-channel. If so then the information code (3) for this slot is set to zero and the frame in which this slot occurs is set as the datum for calculating the offsets for other slots (operations 71 and 72). If the test 70 shows that the marker word received is not the first received in the associated U-channel then the offset between the datum frame and the current frame is calculated in operation 73 and stored as information code (3) for that slot. Following operation 72 or 73 the slot position is entered into the receive slot map (operation 74) and the processor 180 in the transmitter portion 13a is signalled (operation 75) to change the first flag in the marker signals of the corresponding half of the duplex channel to indicate that marker signals have been received. This change is carried out by test 46 and operation 47 of FIG. 2 and the updated synchronisation/marker frame is sent in the operation 33. In operation 76 the information code relating to the status of this slot is changed to (b) and then test 77 is carried out to check the second flag in the marker word. If the flag is not set then there is a return to the operation 64 in FIG. 4a but if it is set then the slot status is changed to (c) (operation 78) and the transmission processor is signalled (operation 79) so that the second flag, indicating that data is about to be sent, can be set in the signals sent in the operation 33. In this case the transmitter starts sending data in the corresponding slot of the duplex link when it reaches the appropriate point in the flow diagrams of FIGS. 2 and 3.

Returning now to the test 65 at the start of FIG. 4b, if the stored status indicates that the flag signals are awaited then a test 81 is carried out to determine whether marker signals are expected at this time. If so a test 82 is used to indicate whether the status of the slot is (b); that is the receiver is waiting for the first flag (far end synchronised) to be set. If the slot has this status then the receive marker word is examined to see if the first flag is set (test 83) and if so then the stored information code of this slot is changed to (c) (operation 84) and the transmit processor is signalled in an operation 85 to indicate that the transmitter is to set the second flag (operations 47 and 33 of FIG. 2) and start sending data as determined by FIG. 3. Following the test 82 or the operation 85 a further test 86 checks whether the second flag is set in the received marker word for this slot and if so then the stored information code (1) is changed to indicate that the slot is active (operation 87).

Following either the end of initialisation as carried out by the flow chart of FIG. 4b, or the tests or operations 51, 54, 55, 58, 60, 62, 63 or 64 of FIG. 4a, the operation 64 is carried out to increase the receive marker count (code 4) and then a test 68 is performed to determine whether the last slot in the slot map has been processed. If not then the number of the next slot to be examined is obtained from the slot map and a return is made to the test 51. Otherwise the frame scan is over and is repeated for another frame.

The number of packet assembly buffers is shown by way of example as five but in practice there is one such buffer for each U-channel and as mentioned above the number of U-channels can vary from 0 to 30.

It will be clear that the invention can be put into operation in many different ways apart from those specifically described above. Clearly other synchronisation patterns and other configurations of computer hardware and algorithms can be used. The language used to implement the algorithms will depend on the type of computers and microprocessors making up the computer 13 but the flow charts given are particularly suitable for programming in Occam the language specially designed for transputers. Since transputers are designed for easy interconnection, additional speed can be obtained by adding one or more transputers for transmission or reception.

The invention may be used with any bit-synchronised digital data network not simply an ISDN as specifically described. Suitable networks are not necessarily time multiplexed and subordinate signals may be transmitted on channels in any order.

We claim:

1. A method of transmitting high bit-rate signals having a variable bit-rate including the steps of
    dividing a digital input signal having a bit-rate higher than a predetermined bit-rate into a sequence of subordinate digital signals having data rates equal to or less than the said predetermined bit-rate,
    transmitting the subordinate digital signals using a group of transmission channels with each subordinate signal transmitted by a respective channel, the channels in the group each being capable of handling the said predetermined bit-rate,
    receiving the transmitted signals,
    assembling the received subordinate signals to provide an output signal in which the sequence of data bits is the same as that of the input signal,
    changing the number of the said transmission channels making up the said group while continuing to transmit subordinate signals along those channels of the said group which are not changed,
    wherein a plurality of input signals are transmitted simultaneously, each input signal being transmitted by way of a respective group of the said transmission channels, each of which is duplex, and the method further including
    inserting marker signals from time to time in each subordinate signal in each said channel and in any other channels which are required to be added to one of the groups,
    the marker signals including first, second and third flag signals depending respectively on whether the channel is transmitting a subordinate signal, whether marker signals have been received in the corresponding channel, and whether a subordinate signal is no longer to be sent by this channel.

2. A method of transmitting high bit-rate signals having a variable bit-rate including the steps of
    dividing a digital input signal having a bit-rate higher than a predetermined bit-rate into a sequence of subordinate digital signals having data rates equal to or less than the said predetermined bit-rate,
    transmitting the subordinate digital signals using a group of transmission channels with each subordinate signal transmitted by a respective channel, the channels in the group each being capable of handling the said predetermined bit-rate, receiving the transmitted signals, assembling the received subordinate signals to provide an output signal in which the sequence of data bits is the same as that of the input signal, and changing the number of the said transmission channels making up the said group while continuing to transmit subordinate signals along those channels of the said group which are not changed, wherein dividing the input signal into subordinate signals is carried out by allocating a first occurring portion of the input signal to a first subordinate signal, a second occurring portion to a second subordinate signal and so on until all the subordinate signals have been allocated, and then repeating the process cyclically.

3. A method according to claim 1 in which each marker signal includes a portion indicating the position of that subordinate signal in the said sequence.

4. A method of transmitting high bit-rate digital signals including the steps of establishing a duplex communication link between first and second locations using a transmission channel capable of transmitting digital signals at a maximum bit-rate which is lower than the said high bit-rate, transmitting at intervals, over the said link, marker signals from the first location to the second location (and from the second location to the first) indicating that data is to be sent over the said channel, on reception of the marker signals transmitting, over the said link, from the second location to the first location and from the first location to the second, a first flag signal indicating that the marker signals have been received, on reception of the first flag signal, transmitting, over the said link, from the first location to the second location and from the second location to the first a second flag signal indicating that a data signal is about to be sent, establishing, using the same procedure as for the said link, at least one further duplex communication link between the first and second locations each said further link using a further transmission channel, dividing an input data signal at one said location into a number of subordinate data signals, one for each said link, transmitting the subordinate data signals to the other said location using the respective said links, and assembling the received subordinate signals to provide an output signal in which the sequence of data bits is the same as that of the input signal.

5. A method according to claim 4 wherein in establishing each said link, neither the marker signals nor the first flag signals nor the second flag signals are constrained to be sent simultaneously from the first and second locations.

6. A method according to claim 4 which allows the establishment of the said links to overlap in time.

7. A method according to any of claims 4, 5 or 6 including transmitting, when required to reduce the number of said links, a third flag signal over one of the links from the first location to the second location and from the second location to the first indicating that no more data is to be sent by that link, and ceasing to send subordinate signals by that link.

8. A method of transmitting high bit-rate signals having a variable bit-rate including the steps of dividing a digital input signal having a bit-rate higher than a predetermined bit-rate into a sequence of subordinate digital signals having data rates equal to or less than the said predetermined bit-rate, transmitting the subordinate digital signals using a group of transmission channels with each subordinate signal transmitted by a respective channel, the channels in the group each being capable of handling the said predetermined bit-rate, receiving the transmitted signals, assembling the received subordinate signals to provide an output signal in which the sequence of data bits is the same as that of the input signal, and changing the number of the said transmission channels making up the said group while continuing to transmit subordinate signals along those channels of the said group which are not changed, wherein the high bit-rate signals are transmitted over a bit-synchronised digital data network which provides the said transmission channels between at least two locations at predetermined bit-rates, each channel being established before transmission, and not by reference to information transmitted in the channel, the network maintaining a frequency that is the same for all channels and is synchronised between all channels and within one period of the said frequency a said channel which is carrying data accepts a predetermined number of bits at one location and delivers the same number of bits at another location.

9. A method according to claim 8 wherein the bit-synchronised digital network is an ISDN and the said transmission channels are time slots.

10. A method according to claim 9 wherein the marker signals are transmitted at intervals of a predetermined number of ISDN frames.

11. Apparatus for use in transmitting and receiving high bit-rate digital signals comprising a transmitter having means for dividing a digital input signal having a bit-rate higher than a predetermined bit-rate into a sequence of subordinate digital signals having data rates equal to or less than the said predetermined bit-rate, and means for transmitting the subordinate digital signals by way of a group of transmission channels, each channel being capable of handling the said predetermined bit-rate, with each subordinate signal transmitted by a respective channel, and a receiver having means for receiving the transmitted signals, and means for assembling the received subordinate signals to provide an output signal in which the sequence of data bits is the same as that of the input signal, the apparatus including means for changing, the number of the said transmission channels making up the said group while continuing to transmit subordinate signals along those channels of the said group which are not changed.

12. Apparatus according to claim 11 wherein the transmitter and receiver are arranged for the simultaneous transmission and reception of a plurality of digital input signals, having a bit-rate higher than the said predetermined bit-rate, over a plurality of respective groups of duplex links, each of which comprises one of the said channels, the transmitter being arranged to insert marker signals from time to time in each subordinate signal in each said channel and in any other channels which are required to be added to one of the groups, the marker signals including first, second and third flag signals depending, respectively, on whether the channel is transmitting a subordinate signal, whether marker signals have been received in the other channel of the pair containing that channel, and whether a subordinate signal is no longer to be sent by that channel.

13. Apparatus for use in transmitting and receiving high bit-rate digital signals comprising
   transmission means arranged to divide an input signal into a number of subordinate signals and to transmit each subordinate signal over respective channels in a group of transmission channels, each capable of transmitting digital signals at a maximum bit-rate which is lower than the said high bit-rate,
   receiving means arranged to assemble subordinate signals received over a group of the said transmission channels to provide an output signal in which the sequence of data bits is the same as that of the original input signal from which those subordinate signals were originally derived,
   the transmission means being arranged to initiate, when required, the addition of a further said transmission channel to the said group by transmitting marker signals indicating that the said group is to be expanded,
   the receiving means being arranged to receive, independently, marker signals and a first flag signal indicating that a remote location has received the marker signals and to cause the transmission means to transmit the first flag signal on reception of the marker signals, and a second flag signal on reception of the first flag signal, over the further channel, the second flag signal indicating that a subordinate signal is about to be transmitted over the further channel, and
   the transmission means also being arranged to increase the number of subordinate signals and transmit one of the resulting subordinate signals over the further channel.

14. Apparatus according to claim 11 wherein the means for dividing the input signal operates by allocating a first occurring portion of the input signal to a first subordinate signal, a second occurring portion to a second subordinate signal and so on until all the subordinate signals have been allocated, and then repeating the process cyclically.

15. Apparatus according to claim 11 for connection to a bit-synchronised digital data network which provides the said transmission channels between at least two locations at predetermined bit-rates, each channel being established before transmission, and not by reference to information transmitted in the channel, the network maintaining a frequency that is the same for all channels and is synchronised between all channels and within one period of the said frequency a said channel which is carrying data accepts a predetermined number of bits at one location and delivers the same number of bits at another location.

16. Apparatus according to claim 15 including
   signalling means for receiving signals from a said network when a duplex communication link has been established between first and second locations, indicating which said channel forms a link between the said locations,
   the transmission means being coupled to the signalling means and to initiate the addition of a further said transmission channel when the signalling means indicates that a further said link has been established.

17. Apparatus according to claim 15 wherein the said network is an ISDN in which the said transmission channels are time slots.

* * * * *